United States Patent Office 3,405,900
Patented Oct. 15, 1968

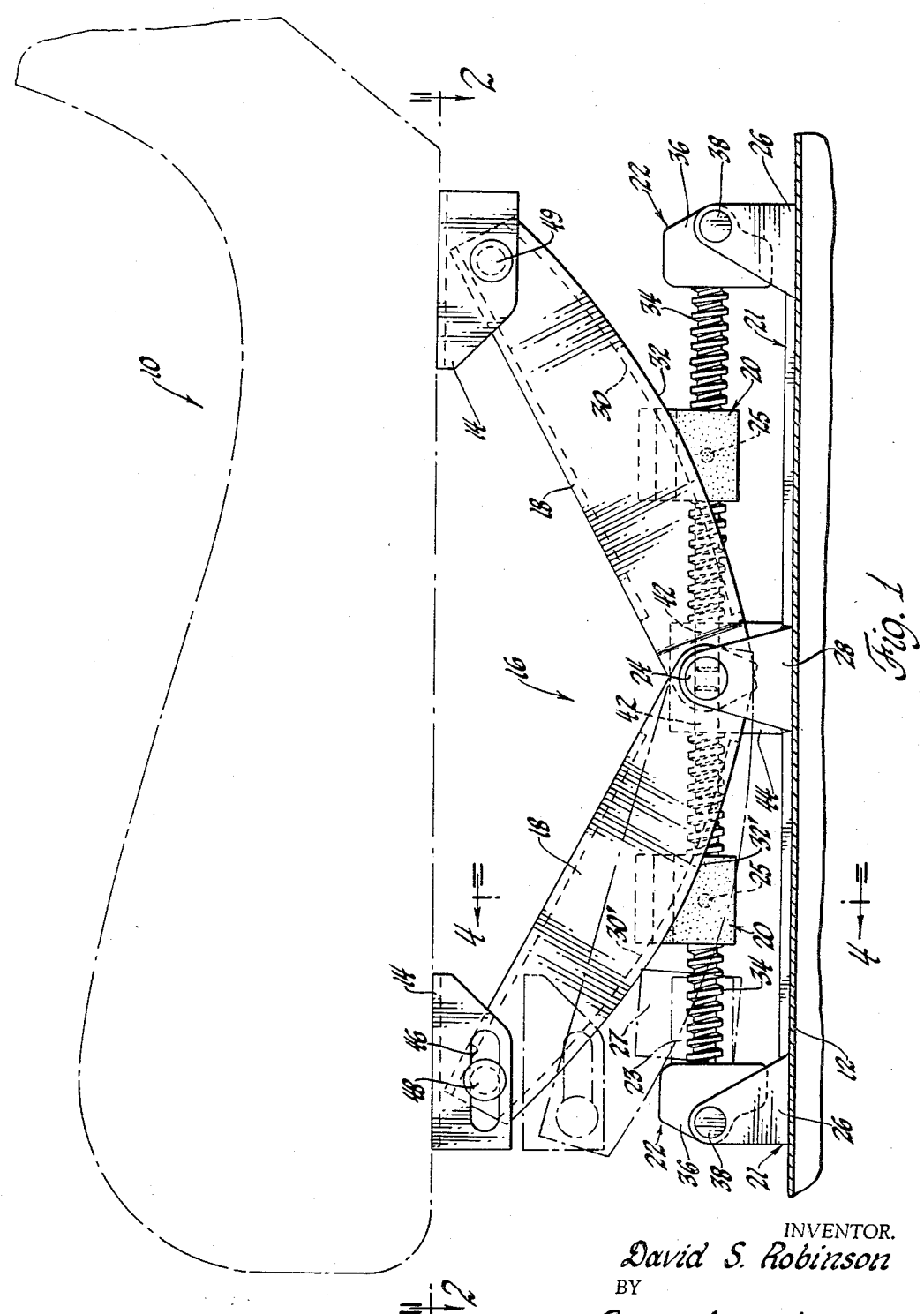

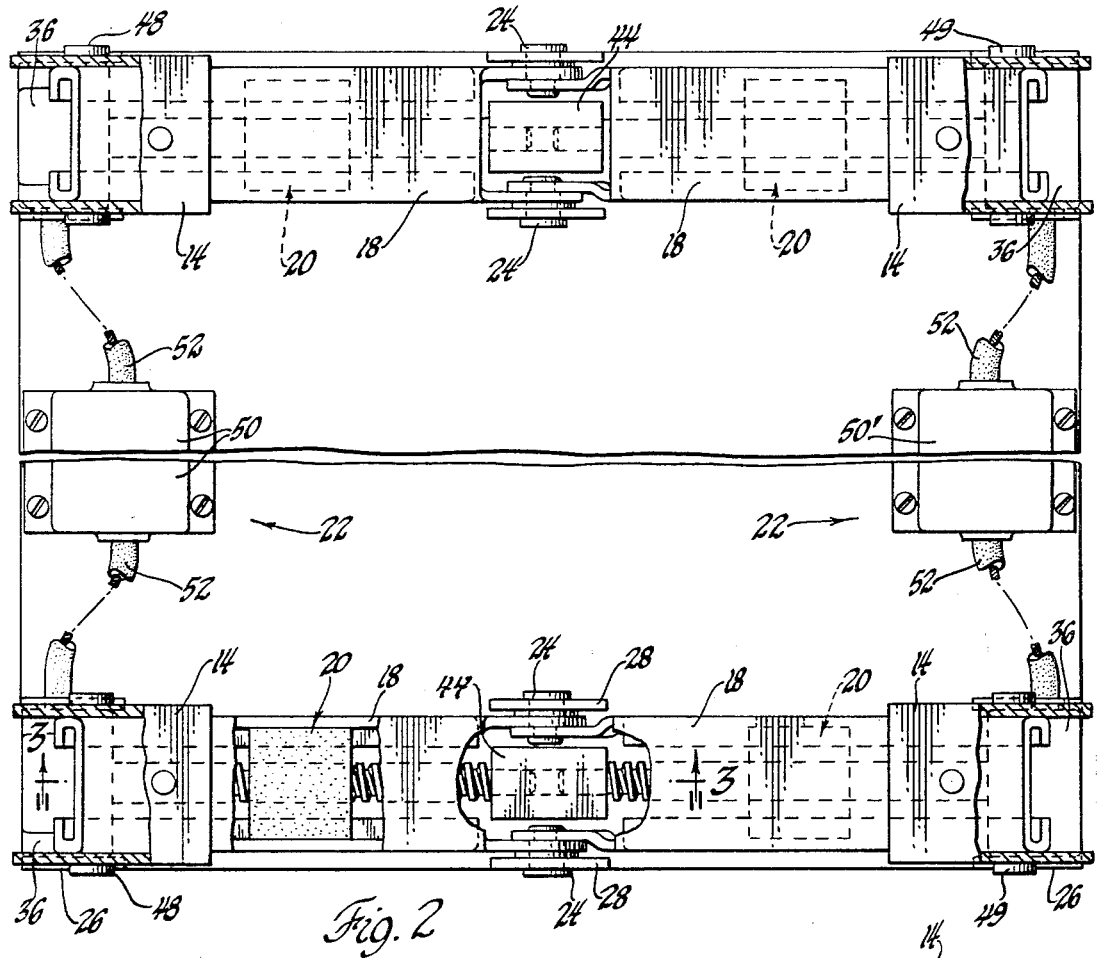

3,405,900
WEDGE ACTUATED SEAT ADJUSTER
David S. Robinson, Detroit, Mich., assignor, by mesne assignments, to Lear Siegler, Inc., Santa Monica, Calif., a corporation of Delaware
Filed Feb. 23, 1966, Ser. No. 529,514
10 Claims. (Cl. 248—396)

ABSTRACT OF THE DISCLOSURE

A seat assembly including a seat having front and rear portions with a mount means for supporting the seat, support means adapted for attachment to a support structure, first wedge means for moving the mount means relative to the support means to raise and lower the front portion of the seat, a second wedge means for moving the mount means relative to the support means to raise and lower the rear portion of the seat, and first and second drive means respectively coacting with the first and second wedge means to independently actuate the first and second wedge means.

---

Adjustable seat assemblies of the type to which the instant invention pertains normally support a seat in a vehicle, or the like, so that the front and rear portions of the seat may be raised or lowered independently of the other for adjusting the position of the seat. The mechanisms heretofore utilized to accomplish such adjustments typically comprise complex linkage systems or jack mechanisms which are expensive to manufacture and difficult to maintain.

It is, therefore an object and feature of this invention to provide a novel adjustable seat assembly wherein a wedge-like member is utilized to force two members to move relative to one another to accomplish the raising and lowering of the respective front and rear portions of the seat.

In general, these and other objects and features of this invention may be attained by an adjustable seat assembly which includes a support means, a member pivotally connected at one end to the support means and pivotally connected at the other end to the mount means, and a block operatively coacting between the member and one of the support means and the mount means in a wedge-like action to move the member relative to the support means whereby the seat is raised or lowered. Preferably, the adjustable seat assembly includes various numbers of such blocks in various combinations to provide various types and degrees of adjustment for the seat.

Other objects and attendant advantages of this invention will be readily appreciated as the same becomes better understood by reference to the following detailed description when considered in connection with the accompanying drawings wherein:

FIGURE 1 is an elevational view of a preferred embodiment of the adjustable seat assembly of the instant invention;

FIGURE 2 is a cross-sectionel view partially broken away and taken substantially along line 2—2 of FIGURE 1;

FIGURE 3 is a cross-sectional view partially broken away and taken substantially along line 3—3 of FIGURE 2; and FIGURE 4 is a cross-sectional view taken substantially along line 4—4 of FIGURE 1.

Referring now to the figures wherein like reference characters indicate like or corresponding parts throughout the several views, the adjustable seat assembly is shown generally at 10.

The adjustable seat assembly 10 includes the support means 12, the mount means 14 adapted for supporting a seat shown in phantom in FIGURE 1, and wedge means, generally indicated at 16, operatively interconnecting the support means 12 and the mount means 14 for moving the mount means 14 relative to the support means 12.

The wedge means 16 includes the first members 18, the blocks 20, and a second member generally indicated at 21 which includes the drive means, generally indicated at 22.

Each member 18 is operatively connected to the upwardly extending flanges 28 of the second member 21 by the pins or rivets 24 for pivotal movement relative thereto. The second member 21 also includes the upwardly extending flanges 26. Each first member 18 includes at least one surface 30 formed thereon and each block 20 has at least one surface 32 formed thereon. Preferably, each surface 30 is a flange and each first member 18 includes a pair of such flanges 30 extending in opposite directions for sliding movement in the surfaces 32 of the blocks 20, which surfaces 32 preferably take the form of grooves.

A groove 32 and a flange 30, therefore, form first and second surfaces which coact together for moving the first surface, which is the flange 30, in a first direction generally in a vertical direction as the second surface, which is the groove 32, moves in a second direction which is generally horizontal. That is to say, as the block illustrated in phantom in FIGURE 1, moves to the right to the position shown in full lines, a first surface or flange 30' moves in a first direction vertically upward as a second surface or groove 32' moves in the second direction horizontally to the right. Instead of using a groove and flange arrangement, each member 18 may coact with a surface on a block 20, which surface is diagonally disposed (disposed at an acute angle with the direction of horizontal movement, which is the same as being disposed at an acute angle with the vertical) so that upon horizontal movement of the block 20, the member 18 coacting therewith will pivot relative to the second member 21 about the rivet 24. Each of the first surfaces formed by the flanges 30 is fixed with respect to a first member 18 because each flange 30 is integral with a member 18, and each of the other surfaces formed by the grooves 30 is movable relative to the associated member 18 and relative to the second member 21 whereby each member 18 is moved relative to the second member 21 upon movement of the surface of groove 30 associated therewith, thus accomplishing vertical adjustment of the seat.

Each block 20 is movable in a fixed path relative to the second member 21 due to its coaction with the threaded shaft 34. It is evident from a comparison of the position of the block shown in phantom in FIGURE 1 to the position shown in full lines that the relative angle of the grooves 32 and 32' in the block change as the block moves horizontally to pivot the associated member 18. To accommodate such a change, each block 20 includes a portion 27 (which may be integral as shown or two separate elements) including the grooves 32 and pivotally connected to the mid-portion 23 through which the threaded bore 40 passes. A pair of circular inserts 25 extend from the mid-portion 23 and into the portion 27 whereby the portion 27 is free to pivot relative to the mid-portion 23 as the block 20 moves along the threaded shaft 34.

The embodiment of the invention illustrated utilizes four blocks 20 and four of the first members 18 and each block 20 includes a pair of grooves 32 which are parallel and receive a pair of flanges 30, the flanges 30 being slidably disposed in the grooves 32. Additionally, the first members 18 are disposed in parallel pairs whereby, upon the attachment of the mount means 14 to a seat, the front pair of block 20 may be moved in unison to move the front pair of first members 18 for raising and lowering the front of the seat and the other pair of blocks 20, at the rear of the seat, may be moved in unison to move the rearward pair of first members 18 for raising and lowering the rear of the seat.

The drive means 22 includes the four gear boxes 36, each of which is connected by a pin 38 to the flanges 26 of the second member 21. The drive means 22 also includes the threaded shafts 34, each of which extend from a gear box 36 and through the threaded bore 40 in one of the blocks 20. Each shaft 34 also has an end 42 which is rotatably supported in a block 44 which is in turn part of the second member 21. The drive means further includes first and second motors 50 and 50'. Each motor is connected to a pair of gear boxes 36 through the motion transmitting cable assemblies 52 so that each motor actuates one pair of blocks 20 whereby one motor 50 is actuated to raise and lower the front of the seat and the other motor 50' is actuated to raise and lower the rear of the seat.

The mount means 14 includes four independent brackets for supporting a seat, but it will be understood that the mount means 14 may take the form of one unitary member and/or may be an integral part of the seat structure. The forward brackets are adapted for attachment to the bottom of a seat and include a slot 46 to receive a pin 48. The pins 48 are attached to a member 18 so that each member 18 is pivotally connected to a bracket of the mount means 14 and each pin 48 slides along a respective slot 46 when the associated member 18 pivots. The rear brackets are adapted for attachment to the bottom of a seat and include a hole to receive pins 49.

It is to be understood that the invention as illustrated utilizes four members 18 and four associated blocks 20; however, the invention may be utilized for independently raising and lowering the rear and front of the seat by utilizing two members 18 disposed on the center line of the seat, provided such an arrangement possesses sufficient lateral stability, so that the front of the seat may be raised and lowered by moving one of the blocks and the rear of the seat may be raised and lowered by moving the other block.

The invention has been described in an illustrative manner and it is to be understood that the terminology which has been used is intended to be in the nature of words of description rather than of limitation.

Obviously, many modifications and variations of the invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A seat assembly comprising: a seat having front and rear portions and including mount means; a support means adapted for attachment to a support structure; first wedge means for moving said mount means relative to said support means to raise and lower said front portion of said seat; second wedge means for moving said mount means relative to said support means to raise and lower said rear portion of said seat; said first wedge means including first and second members movable relative to one another, a first block operatively interconnecting said members, first and second surfaces respectively on said first member and said block and slidably coacting together for moving said first surface in a first direction as said second surface moves in a second direction, said surfaces each being elongated for providing an area of sliding contact therebetween and disposed at an acute angle relative to both of said first and second directions, said block being operably movable in a fixed path relative to said second member whereby said surfaces slidably coact to move said first member relative to said member upon movement of said block in said fixed path, one of said block and said first member having a groove defining one of said surfaces and the other having a flange disposed in said groove and defining the other of said surfaces.

2. An assembly as set forth in claim 1 wherein said flange and said groove are disposed generally transverse to said first direction so that the sides of said flange and groove are in sliding contact with one another.

3. An assembly as set forth in claim 1 wherein said second wedge means includes a third member and a second block for moving said third member relative to said first member upon movement of said second block.

4. An assembly as set forth in claim 3 wherein one of said second block and said third member has a groove and the other has a flange slidably disposed therein, said second and third members operatively interconnecting said mount means and said support means so that said front portion of said seat may be raised and lowered by moving one of said blocks and said rear portion of said seat may be raised and lowered by moving the other of said blocks.

5. An assembly as set forth in claim 4 including first drive means selectively operable for moving said first block to position said front portion independently of said rear portion, and second drive means selectively operable for moving said second block to position said rear portion independently of said front portion.

6. An assembly as set forth in claim 5 wherein each of said first and second blocks has a threaded bore therein and said drive means include a threaded shaft in threaded engagement with each bore whereby said blocks are moved upon rotation of the respective shafts.

7. An assembly as set forth in claim 6 wherein each block includes a portion including said grooves and which is pivotally connected to the portion through which said threaded bore passes.

8. An assembly as set forth in claim 5 including a pair of said first members disposed in parallel, a pair of said first blocks, each of said first blocks having a pair of said grooves which are parallel, each of said first members including a pair of said flanges which are slidably disposed in said grooves of one of said first blocks, a pair of said third members disposed in parallel, a pair of second blocks, each of said second blocks having a pair of grooves which are parallel, each of said third members including a pair of said flanges which are slidably disposed in said grooves of said one of said second blocks whereby one pair of said blocks may be moved in unison by one of said drive means to move one pair of said members to raise and lower said front portion of said seat and the other pair of said blocks may be moved in unison by the other drive means to move the other pair of said members to raise and lower said rear portion of said seat.

9. An assembly as set forth in claim 8 wherein at least one block of each pair includes a threaded bore therein and each drive means includes at least one threaded shaft disposed in said threaded bore and a gear box in driving engagement therewith.

10. An adjustment assembly of the type adapted to support a seat and comprising: support means, mount means, and wedge means operatively interconnecting said support means and said mount means for moving said mount means relative to said support means and including at least two coacting surfaces which are in sliding contact with one another, at least one of said surfaces disposed at an acuate angle with the vertical so that upon generally horizontal movement thereof said other surface slides therealong and moves generally in a vertical direction; said wedge means including first and second members pivotally connected together and a block, one of said surfaces being defined by a groove in said block and the other being defined by a flange extending from said first member and slidably disposed in said groove, said flange extending generally laterally from said first member, said block engaging said first member, said block engaging said second member for movement therealong whereby said first and second members pivot relative to one another, a third member pivotal relative to said first and second members, a second block having a groove therein, said third member having a laterally extending flange slidably disposed in said groove in said second block, said second block being movable along one of said first and second members whereby said third member pivots upon movement of said second block.

UNITED STATES PATENTS

References Cited

| | | | |
|---|---|---|---|
| 3,037,735 | 6/1962 | Matthews | 248—394 |
| 3,330,523 | 7/1967 | Nichols | 248—419 |
| 780,933 | 1/1905 | Brown | 108—147 |
| 3,218,102 | 11/1965 | Specketer | 297—330 |

FOREIGN PATENTS

| | | |
|---|---|---|
| 683,333 | 11/1952 | Great Britain. |
| 54,431 | 3/1890 | Germany. |

ROY D. FRAZIER, *Primary Examiner.*

R. P. SEITTER, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,405,900                                        October 15, 1968

David S. Robinson

It is certified that error appears in the above identified patent and that said Letters Patent are hereby corrected as shown below:

Column 4, line 15, claim reference numeral "1" should read -- 2 --.

Signed and sealed this 3rd day of March 1970.

(SEAL)
Attest:

Edward M. Fletcher, Jr.                              WILLIAM E. SCHUYLER, JR.
Attesting Officer                                            Commissioner of Patents